United States Patent
Schneider

(10) Patent No.: US 7,346,202 B1
(45) Date of Patent: Mar. 18, 2008

(54) AUTOMATICALLY DETECTING THE PRESENCE OF CONTRAST AGENT IN MEDICAL IMAGE

(75) Inventor: Alexander C. Schneider, Los Altos, CA (US)

(73) Assignee: R2 Technology, Inc., Santa Clara, CA (US)

( * ) Notice: Subject to any disclaimer, the term of this patent is extended or adjusted under 35 U.S.C. 154(b) by 621 days.

(21) Appl. No.: 10/998,238

(22) Filed: Nov. 24, 2004

(51) Int. Cl.
*G06K 9/00* (2006.01)

(52) U.S. Cl. .................. 382/128; 382/134; 600/431; 128/922

(58) Field of Classification Search .............. 382/130
See application file for complete search history.

(56) References Cited

U.S. PATENT DOCUMENTS

| | | | |
|---|---|---|---|
| 6,141,437 A | 10/2000 | Xu et al. | |
| 6,662,038 B2 | 12/2003 | Prince | |
| 2003/0099388 A1 | 5/2003 | Doi et al. | |

*Primary Examiner*—Jefferey Harold
*Assistant Examiner*—Soo Jin Park
(74) *Attorney, Agent, or Firm*—Morgan, Lewis & Bockius LLP

(57) ABSTRACT

A CAD system pre-analyzes a medical image to automatically determine whether contrast agent was introduced into the patient before forming that image. In one embodiment, contrast agent detection is performed by comparing the voxel values in known blood-containing areas to voxel values of known water-containing areas, and if there is a substantial difference above a preferred threshold, then it is determined that this patient was indeed injected with the contrast agent. Upon finding that the patient was indeed injected with contrast agent, the CAD algorithm then automatically performs both a detection algorithm that uses the contrast agent and one that does not and notifies the clinician that both sets of results are available to look at. However, if it is determined that the patient was not injected with contrast agent, the CAD algorithm does not perform the algorithm that uses the contrast agent does not give the user the option to view any results from such algorithm. The invention may be practiced with a variety of imaging technologies some of which may not require an explicit comparison of the voxel values from the blood-containing and water-containing areas.

18 Claims, 3 Drawing Sheets

AUTOMATICALLY DETECTING THE PRESENCE OF CONTRAST AGENT IN MEDICAL IMAGE

BACKGROUND

The concept of "CAD" in the medical context, i.e., using a computer to search for abnormalities in a medical image, is well known. The acronym "CAD" has been used interchangeably to refer to any of the following terms: computer-aided detection, computer-assisted detection, computer-aided diagnosis, and computer-assisted diagnosis.

Recently, CAD systems have been developed that can search for cancerous or precancerous nodules in the lung by examining a three-dimensional volume of data acquired using x-ray CT (computed tomography). There have also been discussions of CAD algorithms that look for "pulmonary embolisms" (PE's) in those same three-dimensional volumes of data. A pulmonary embolism (PE) occurs when a clump of material such as a piece of plaque or a blood clot travels through the blood stream and becomes lodged in a pulmonary artery. Importantly, PE detection relies on the presence of a contrast medium, such as an iodinated agent, in the blood stream of the patient at the time of CT scanning. The contrast agent causes blood within the arteries to appear very brightly in the 3D medical image, and this facilitates PE detection because the PE's then show up as dark protrusions or discontinuities in the bright blood stream.

Workflow-related problems can arise because CAD nodule detection does not require the presence of the contrast agent in the patient, whereas CAD PE detection does require the presence of the contrast agent in the patient. Specifically, if the PE detection algorithm is performed by the CAD system when there has not been any contrast agent injected, there may be misleading results. Even worse, since the information systems used in the clinical environment can sometimes be erroneous regarding whether the contrast agent was introduced, it is not always reliable to depend on "header" information that might be associated with the CT scan for this crucial piece of information.

Similar workflow-related problems can arise in other circumstances where contrast agents are used in one type of detection algorithm and not in another type of detection algorithm performed on the same image volume.

SUMMARY

According to the present invention, a CAD system pre-analyzes a medical image to automatically determine whether contrast agent was introduced into the patient before that image was made. In one preferred embodiment, contrast agent detection is performed by comparing the gray scale values of pixels in known blood-containing areas of the medical image to gray scale values of pixels in water-containing areas, and if there is a substantial difference above a predetermined threshold, then it is determined that the patient was indeed injected with the contrast agent. Upon finding that the patient was injected with contrast agent, the CAD algorithm then automatically performs both a detection algorithm that uses the contrast agent and one that does not and notifies the clinician that both sets of results are available to look at. However, if it is determined that the patient was not injected with contrast agent, the CAD algorithm does not perform the algorithm that uses the contrast agent and does not give the user the option to view any results from such algorithm. Advantageously, this avoids the possibility of giving false reports to the clinician. Importantly, the CAD algorithm does not depend on the accuracy of the hospital information system regarding whether that particular patient was injected with the contrast agent. Notably, any of a variety of methods for contrast agent detection could be used without departing from the scope of the invention.

A particular application of the invention arises in the analysis of three-dimensional CT lung volumes where a contrast agent is used in detecting pulmonary embolisms but is not used in searching for cancerous or precancerous nodules.

The invention may be used in a variety of medical imaging technologies, such as x-ray, CT, ultrasound, MRI and SPECT. In some of these technologies, it may not be necessary to perform an explicit comparison between voxel values in the blood-containing and water-containing areas.

BRIEF DESCRIPTION OF THE DRAWINGS

These and other objects, features and advantages of the invention will be more readily apparent from the following detailed description of the invention in which.

DETAILED DESCRIPTION

Figure 1:
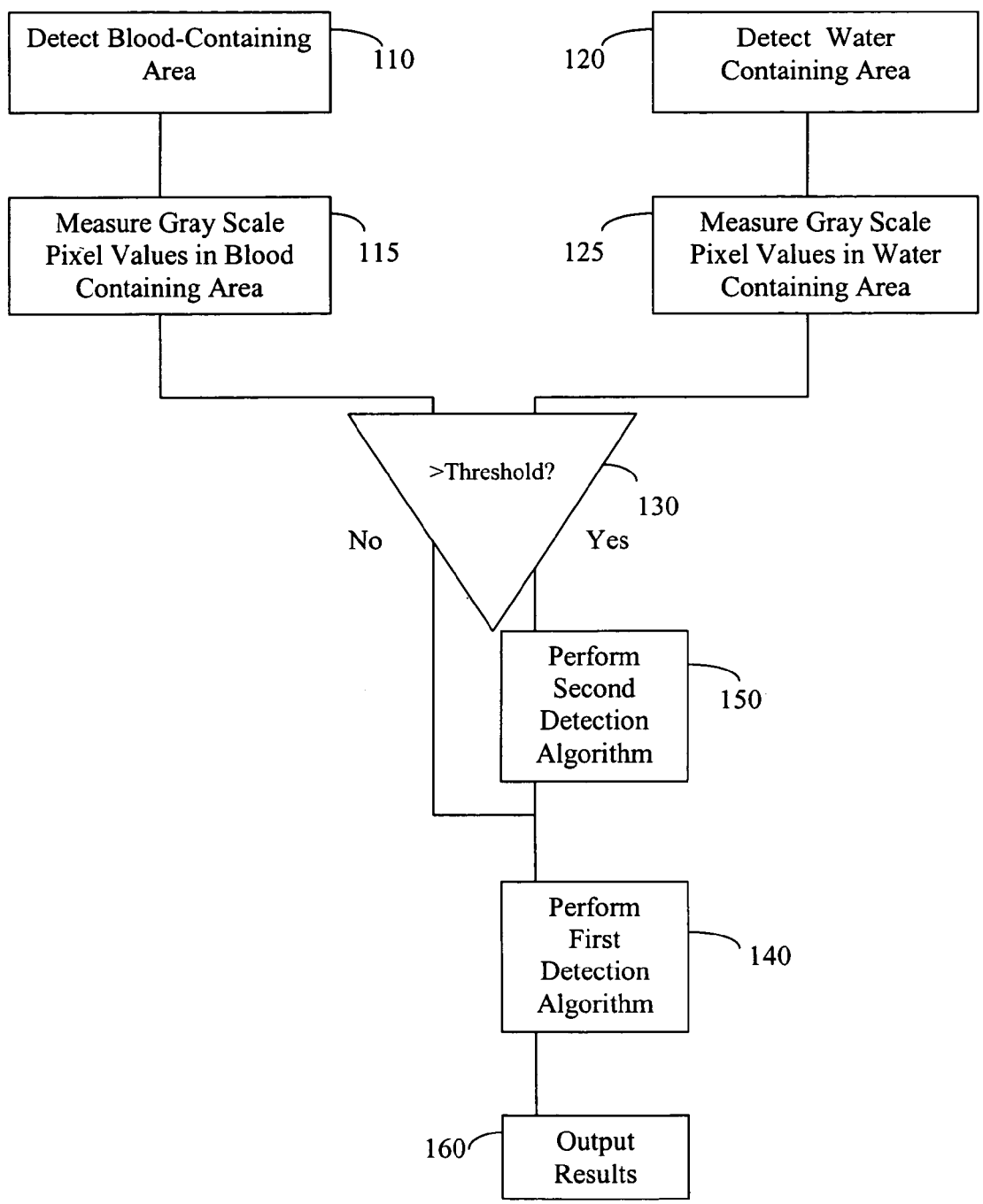
FIG. 1 is a flowchart of first embodiment of the invention.

FIG. 1 is a flowchart depicting the steps of one embodiment of the invention as implemented by a CAD system processing a three-dimensional volume of data. At step 110, the CAD system analyzes the data to detect a blood-containing area. In the case of an image of the lung, the analysis might be performed to locate one or more of the major blood vessels connected to the heart. At step 115, the gray scale values of the pixels in the blood-containing area are measured. At step 120, the CAD system analyzes the data to detect a water-containing area; and at step 125, the gray scale values of the pixels in the water-containing area are measured.

At step 130, the gray scale values from the two measurements are compared. Ordinarily, the gray scale values of blood are not much greater than those of water. Hence, if the two values are close to one another, there is no contrast agent in the blood and the only detection algorithm or algorithms to be performed are those that do not rely on the use of a contrast agent. However, if a contrast agent is present in the blood, the gray scale values of the pixels in the blood containing area will be significantly greater than those in the water containing area and both the detection algorithm that uses the contrast agent and any detection algorithm that does not use the contrast agent can be performed.

Accordingly, if the comparison reveals that the contrast agent is present, both the first and second detection algorithms are performed at steps 140 and 150 where the second detection algorithm is an algorithm that uses the contrast agent while the first detection algorithm does not use the contrast agent. And if the comparison reveals that the contrast agent is not present, only the first detection algorithm is performed. The results of the algorithm(s) are then output at step 160. Advantageously, the output also includes a report indicating whether the first algorithm or both algorithms were performed.

Figure 2:
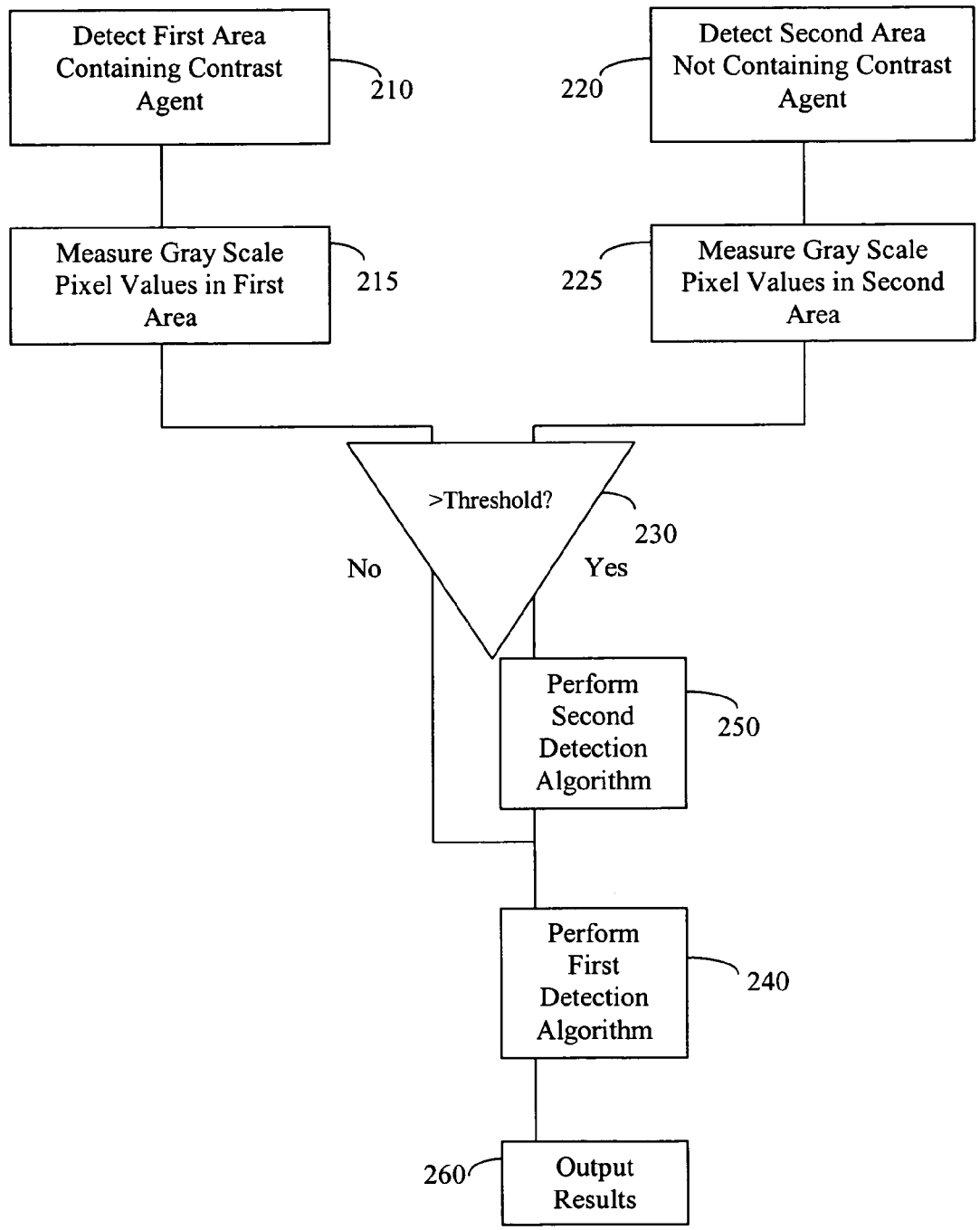
FIG. 2 is a flowchart of a second embodiment of the invention.

The present invention may be practiced to detect the presence of contrast medium in any anatomical region. FIG. 2 is a flow chart depicting the steps of a second embodiment of the invention as implemented by a CAD system processing a three-dimensional volume of data. At step 210, the CAD system analyzes the data to detect a first anatomical region in which contrast agent may be present. At step 215, the gray scale values of the pixels in the first region are measured. At step 220, the CAD system analyzes the data to detect a second anatomical region similar to the first anatomical region but known not to contain the contrast agent; and at step 225, the gray scale values of the pixels in the second anatomical region are measured.

At step 230, the gray scale values from the two measurements are compared. If a contrast agent is present in the first anatomical region, the gray scale values of the pixels in the first region will be significantly greater than those in the second region and both the detection algorithm that uses the contrast agent and any detection algorithm that does not use the contrast agent can be performed.

Accordingly, if the comparison reveals that the contrast agent is present, both the first and second detection algorithms are performed at steps 240 and 250 where the second detection algorithm is an algorithm that uses the contrast agent while the first detection algorithm does not use the contrast agent. And if the comparison reveals that the contrast agent is not present, only the first detection algorithm is performed. The results of the algorithm(s) are then output at step 260. Advantageously, the output also includes a report indicating whether the first algorithm or both algorithms were performed.

In some medical imaging systems, there is no need to make an explicit comparison of the gray scale values in the regions containing contrast agent with those in the regions that do not contain contrast agent because the gray scale values that are used are normalized to water. In particular, in CT imaging systems, exposure is normalized and expressed in terms of Hounsfield units in a range from about −1000 to +3000 where −1000 corresponds to air, water is 0 and dense bone can range up to +3000. Blood is typically about 50 or so and blood with contrast agent ranges from about 200 to 500.

Figure 3:
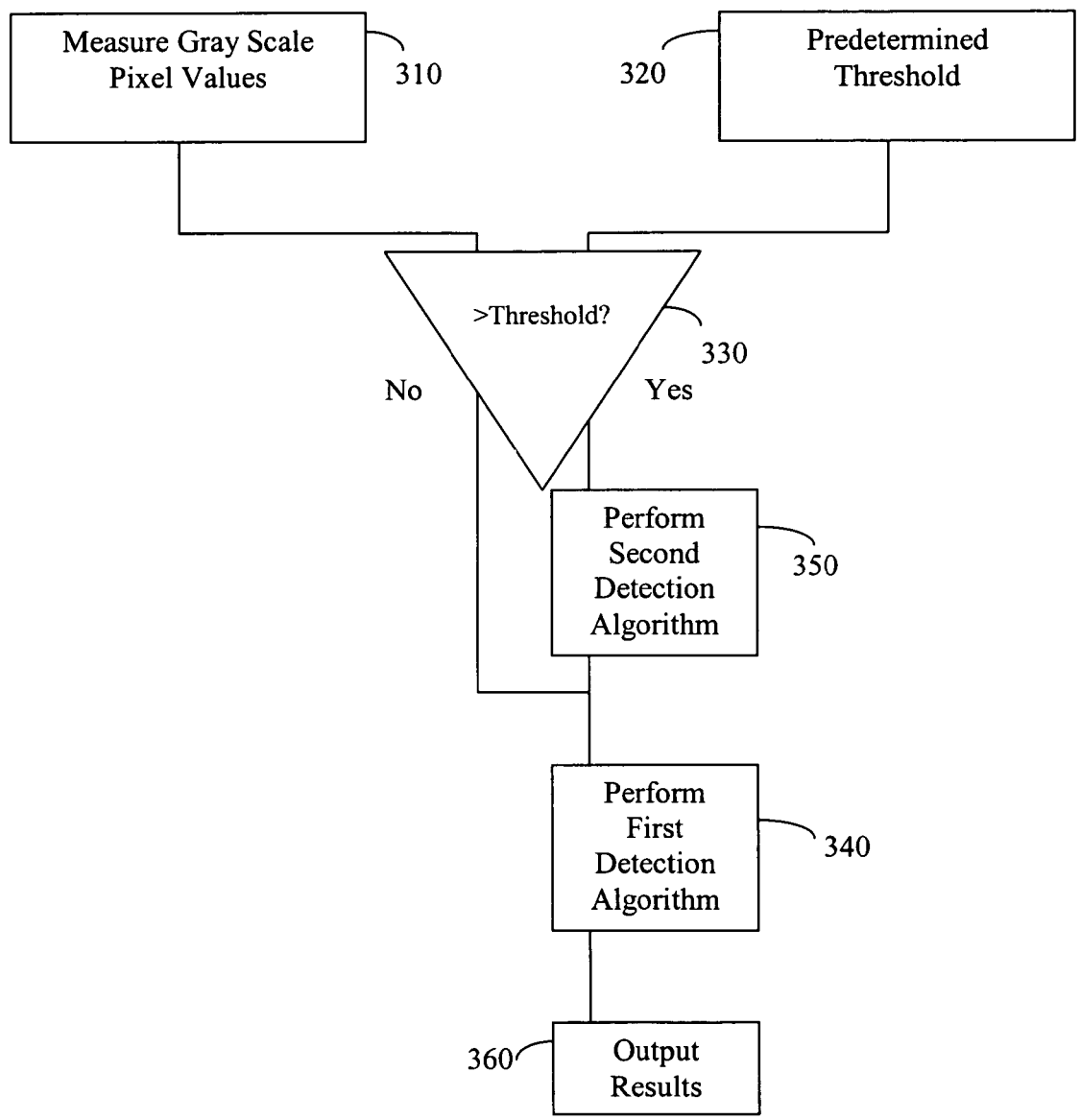
FIG. 3 is a flowchart of a third embodiment of the invention.

FIG. 3 is a flow chart depicting the steps of a third embodiment of the invention implemented by a CAD system processing a three-dimensional volume of CT data. At step 310, the CAD system analyzes the data to detect contrast agent in a first anatomical region such as a blood-containing area.

In this embodiment of the invention, the contrast agent in the first anatomical region is detected by counting the number of image pixels in the medical image that have gray scale value in excess of a predetermined value such as 100 Hounsfield units. The count is then compared by a comparator 330 with a second threshold 320 set at a value slightly below the minimum number of pixels in the medical image that can be expected to contain contrast agent. In the case of blood-containing areas in the lung, approximately 15% of the total number of pixels in the medical image can be expected to be associated with blood-containing areas and the second threshold is set at approximately this number.

If the comparison reveals that the number of image pixels having a gray scale value in excess of 100 Hounsfield units is more than the second threshold, it is assumed that contrast agent is present; and both the first and second detection algorithms are performed at steps 340 and 350 where the second detection algorithm is an algorithm that uses the contrast agent while the first detection algorithm does not use the contrast agent. And if the comparison reveals that the contrast agent is not present, only the first detection algorithm is performed. The results of the algorithm(s) are then output at step 360. Advantageously, reports are provided as part of the output indicating whether the first algorithm or both algorithms were performed.

What is claimed is:

1. A method for CAD analysis of a medical image of a patient, comprising:
   performing a first CAD abnormality detection algorithm on the medical image, said first CAD abnormality detection algorithm not requiring the presence of contrast agent in the patient;
   automatically determining, based only on the contents of the medical image, whether the patient was administered a contrast agent; and
   if it is determined that the patient was administered a contrast agent, performing a second CAD abnormality detection algorithm on the medical image, said second CAD abnormality detection algorithm requiring the presence of the contrast agent.

2. The method of claim 1 further comprising the steps of:
   if it is determined that the patient was not administered a contrast agent, informing the reviewing clinician that results corresponding to only said first CAD abnormality detection algorithm are available for review; and
   if it is determined that the patient was administered a contrast agent, informing the reviewing clinician that results corresponding to both said first and said second CAD abnormality detection algorithms are available for review.

3. The method of claim 1, wherein said medical image is a three-dimensional lung volume, said first CAD abnormality detection algorithm is a lung nodule detection algorithm, and said second CAD abnormality detection algorithm is a pulmonary embolism detection algorithm.

4. The method of claim 1 wherein the step of automatically determining comprises the steps of measuring gray scale values of image pixels in a blood-containing area of the medical image and comparing said values with gray scale values of image pixels in a water containing area of the medical image.

5. The method of claim 4 wherein the step of automatically determining further comprises the step of detecting a blood-containing area of the medical image.

6. The method of claim 5 wherein the step of automatically determining further comprises the step of detecting a water containing area of the medical image.

7. The method of claim 5, wherein said medical image is a three-dimensional lung volume, said first CAD abnormality detection algorithm is a lung nodule detection algorithm, and said second CAD abnormality detection algorithm is a pulmonary embolism detection algorithm.

8. The method of claim 1 wherein the step of automatically determining comprises the steps of counting the number of image pixels in the medical image having a gray scale value in excess of a first predetermined threshold and comparing said count with a second predetermined threshold.

9. The method of claim 8, wherein said medical image is a three-dimensional lung volume, said first CAD abnormality detection algorithm is a lung nodule detection algorithm, and said second CAD abnormality detection algorithm is a pulmonary embolism detection algorithm.

10. The method of claim 8 wherein the gray scale values are expressed in Hounsfield units.

11. The method of claim 8 wherein the first predetermined threshold is 100 Hounsfield units.

12. The method of claim 8 wherein the second predetermined threshold is 15% of the total number of image pixels in the medical image.

13. A method for CAD analysis of a medical image of a patient comprising:

counting the number of pixels in the medical image having a gray scale value in excess of a first predetermined threshold;
comparing said count with a second predetermined threshold;
if said count does not exceed said second threshold, performing a first CAD abnormality detection algorithm on the medical image, said first CAD abnormality detection algorithm not requiring the presence of contrast agent in the patient; and
if said count exceeds said second threshold performing on the medical image both the first CAD abnormality detection algorithm and a second CAD abnormality detection algorithm, said second CAD abnormality detection algorithm requiring the presence of contrast agent in the patient.

14. The method of claim 13 further comprising the step of informing a reviewing clinician whether the first CAD detection algorithm or the first and second CAD detection algorithms were performed.

15. The method of claim 13, wherein said medical image is a three-dimensional lung volume, said first CAD abnormality detection algorithm is a lung nodule detection algorithm, and said second CAD abnormality detection algorithm is a pulmonary embolism detection algorithm.

16. The method of claim 13 wherein the gray scale values are expressed in Hounsfield units.

17. The method of claim 13 wherein the first predetermined threshold is 100 Hounsfield units.

18. The method of claim 13 wherein the second predetermined threshold is 15% of the total number of image pixels in the medical image.

* * * * *